United States Patent
Jiang et al.

(10) Patent No.: US 7,704,480 B2
(45) Date of Patent: Apr. 27, 2010

(54) METHOD FOR MAKING CARBON NANOTUBE YARN

(75) Inventors: Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/586,976

(22) Filed: Oct. 26, 2006

(65) Prior Publication Data

US 2007/0166223 A1 Jul. 19, 2007

(30) Foreign Application Priority Data

Dec. 16, 2005 (CN) .................. 2005 1 0120716

(51) Int. Cl.
*D01F 9/12* (2006.01)
(52) U.S. Cl. .............. 423/447.2; 423/447.1; 423/447.3; 428/367
(58) Field of Classification Search .............. 423/447.1, 423/447.2, 447.3; 428/367
See application file for complete search history.

(56) References Cited

U.S. PATENT DOCUMENTS

| 6,790,425 | B1 | 9/2004 | Smalley et al. | |
|---|---|---|---|---|
| 7,045,108 | B2 * | 5/2006 | Jiang et al. | 423/447.2 |
| 2002/0113335 | A1 | 8/2002 | Lobovsky et al. | |
| 2003/0069792 | A1 | 4/2003 | Blumenthal et al. | |
| 2003/0198812 | A1 | 10/2003 | Rueckes et al. | |
| 2004/0051432 | A1 | 3/2004 | Jiang et al. | |
| 2004/0053053 | A1 | 3/2004 | Jiang et al. | |
| 2004/0053780 | A1 * | 3/2004 | Jiang et al. | 502/182 |
| 2004/0217520 | A1 | 11/2004 | Hong et al. | |
| 2007/0116631 | A1 * | 5/2007 | Li et al. | 423/447.3 |

FOREIGN PATENT DOCUMENTS

| CN | 1484275 A | 3/2004 |
|---|---|---|
| JP | 61266666 | 11/1986 |
| JP | 62141171 | 6/1987 |
| JP | 63264918 | 11/1988 |
| JP | 2004-036038 | 5/2004 |
| JP | 2004-217456 A | 8/2004 |

(Continued)

OTHER PUBLICATIONS

Zhang, et al., Multifunctional Carbon Nanotube Yarns by Downsizing an Ancient Technology, Science 2004; 306: 1358-1361.*

(Continued)

*Primary Examiner*—Stanley S. Silverman
*Assistant Examiner*—Daniel C. McCracken
(74) *Attorney, Agent, or Firm*—D. Austin Bonderer

(57) ABSTRACT

A carbon nanotube yarn includes a number of carbon nanotube yarn strings bound together, and each of the carbon nanotube yarn strings includes a number of carbon nanotube bundles that are joined end to end by van der Waals attractive force, and each of the carbon nanotube bundles includes a number of carbon nanotubes substantially parallel to each other. A method for making the carbon nanotube yarn includes soaking the at least one carbon nanotube yarn string drawn out from a carbon nanotube array in an organic solvent to shrink it and then collecting it.

12 Claims, 7 Drawing Sheets

FOREIGN PATENT DOCUMENTS

| | | |
|---|---|---|
| JP | 2004277907 | 10/2004 |
| JP | 2005089738 | 4/2005 |
| JP | 2005-154950 A | 6/2005 |
| TW | 200407260 A | 5/2004 |
| WO | WO 01/53199 A2 | 7/2001 |
| WO | WO2004052489 | 6/2004 |
| WO | WO 2006/073460 * | 5/2005 |
| WO | WO 2007/015710 A2 * | 2/2007 |

OTHER PUBLICATIONS

Chen, et al., Noncovalent Sidewall Functionalization of Single-Walled Carbon Nanotubes for Protein Immobilization, J. Am. Chem. Soc. 2001; 123: 3838-3839.*

KaiLi Jiang et.al, Spinning Continuous CNT Yarns, Nature, 2002, 419, 801.

"Multifunctional Carbon Nanotube Yarns by Downsizing an Ancient Technology",Mel Zhang, Ken R.Atkinson,Ray H. Baughman,Science, 2004, vol. 306. p. 1358-1361.

* cited by examiner

METHOD FOR MAKING CARBON NANOTUBE YARN

TECHNICAL FIELD

The present invention relates to nanotubes, and more particularly to a carbon nanotube yarn and method for making the same.

DISCUSSION OF RELATED ART

Carbon nanotubes are tubules of carbon generally having a length of 5 to 100 micrometers and a diameter of 5 to 100 nanometers. Carbon nanotubes can be composed of a number of co-axial cylinders of graphite sheets and have recently attracted a great deal of attention for use in different fields such as field emitters, gas storage and separation, chemical sensors and high strength composites. However, carbon nanotubes are almost never used in microscopic applications at present as it is very difficult to manipulate the carbon nanotubes as a microscopic level. So, assembling carbon nanotubes into macroscopic structures is of great importance to their applications at the macroscopic level.

That a long macroscopic carbon nanotube yarn can be drawn out from a super-aligned carbon nanotube allay has been disclosed in U.S. Pat. No. 7,045,108. The carbon nanotube yarn includes a plurality of carbon nanotube bundles that are joined end to end by van der Waals attractive force, and each of the carbon nanotube bundles includes a plurality of carbon nanotubes substantially parallel to each other. Referring to FIG. 7, a simple model of a continued carbon nanotube yarn 14 being drawn out from a super-aligned carbon nanotube array 10 is shown. A number of carbon nanotube bundles 12 are joined end to end by van der Waals attractive force to form the continued carbon nanotube yarn 14. However, in general, the carbon nanotube yarn 14 is several centimeters in length and several microns in thickness. A ratio of surface area to volume of the carbon nanotube yarn 14 is very great, and the surface of it is very clean, so it is very sticky and as such macroscopic level application of the carbon nanotube yarn 14 is restricted to a great extent.

SUMMARY

A carbon nanotube yarn and method for making the same according to a preferred embodiment is provided.

The method includes the steps of:
(1) providing a carbon nanotube array;
(2) drawing out at least one carbon nanotube yarn string from the carbon nanotube array;
(3) treating the at least one carbon nanotube yarn string using an organic solvent in a manner such that the at least one carbon nanotube yarn string is formed into a single strand of carbon nanotube yarn.

The carbon nanotube yarn includes at least one carbon nanotube yarn string juxtaposedly attached to each other, the at least one carbon nanotube yarn string includes a number of carbon nanotube bundles which are joined end to end by van der Waals attractive force, and each of the carbon nanotube bundles includes a number of carbon nanotubes substantially parallel to each other.

BRIEF DESCRIPTION OF THE DRAWINGS

Many aspects of the present carbon nanotube yarn and method for making the same can be better understood by reference to the following description of embodiments thereof taken in conjunction with the accompanying drawings.

The exemplifications set out herein illustrate at least one preferred embodiment of the present carbon nanotube yarn and method for making the same, in one form, and such exemplifications are not to be construed as limiting the scope of the invention in any manner.

DETAILED DESCRIPTION OF PREFERRED EMBODIMENTS

Reference will now be made to the drawings to describe in detail the preferred embodiments of the present carbon nanotube yarn and method for making the same, in detail.

Figure 1:
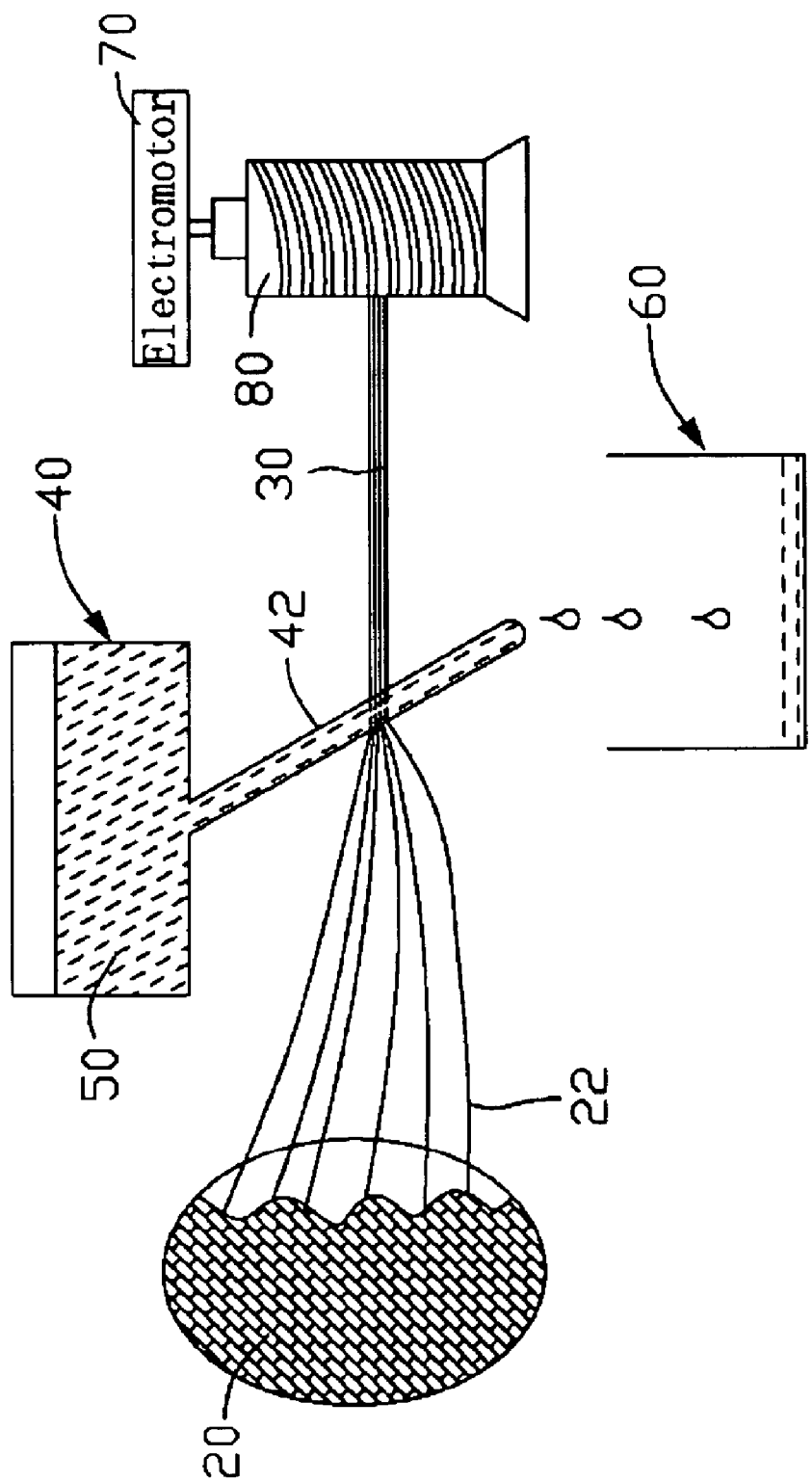
FIG. 1 is a schematic view of a device for making a carbon nanotube yarn in accordance with a preferred embodiment of the present invention.

Referring to FIG. 1, a method for making carbon nanotube yarn includes the steps of:
(1) providing a carbon nanotube array 20;
(2) drawing out a number of carbon nanotube yarn strings 22 from the carbon nanotube array 20;
(3) treating the number of carbon nanotube yarn strings 22 using an organic solvent 50 in a manner such that the number of carbon nanotube yarn strings 22 are formed into a single strand of carbon nanotube yarn 30.

In the step (1), the carbon nanotube array 20 is generally a super-aligned carbon nanotube array. The carbon nanotube array 20 can be manufactured using a chemical vapor deposition method. The method is disclosed in U.S. Pat. No. 7,045,108, which is incorporated herein by reference. For illustrative purposes, the method for manufacturing the carbon nanotube array 20 is described below, and includes the steps of:

(a) providing a substantially flat and smooth substrate, the substrate can be a p-type or n-type silicon wafer;

(b) depositing a catalyst on the substrate, the catalyst being selected from the group consisting of iron, cobalt, nickel or alloys of the same;

(c) annealing the substrate with the catalyst in protective gas at 300~400° C. for about 10 hours;

(d) heating the annealed substrate with the catalyst to 500~700° C., supplying a mixture of carbon containing gas and protective gas, controlling a difference between the local temperature of the catalyst and the environmental temperature to be at least 50° C., controlling a partial pressure of the carbon containing gas to be less than 0.2, and growing a number of carbon nanotubes on the substrate after 5~30 minutes such that the carbon nanotube array 20 is formed on the substrate. The carbon containing gas can be a hydrocarbon such as acetylene, ethane etc. The protective gas can be an inert gas or nitrogen gas.

The superficial density of the carbon nanotube array 20 manufactured by above-described process with carbon nanotube bundles being compactly bundled up together is higher. The van der Waals attractive force between adjacent carbon nanotube bundles is strong, and diameters of the carbon nanotubes are correspondingly substantial.

Figure 2:
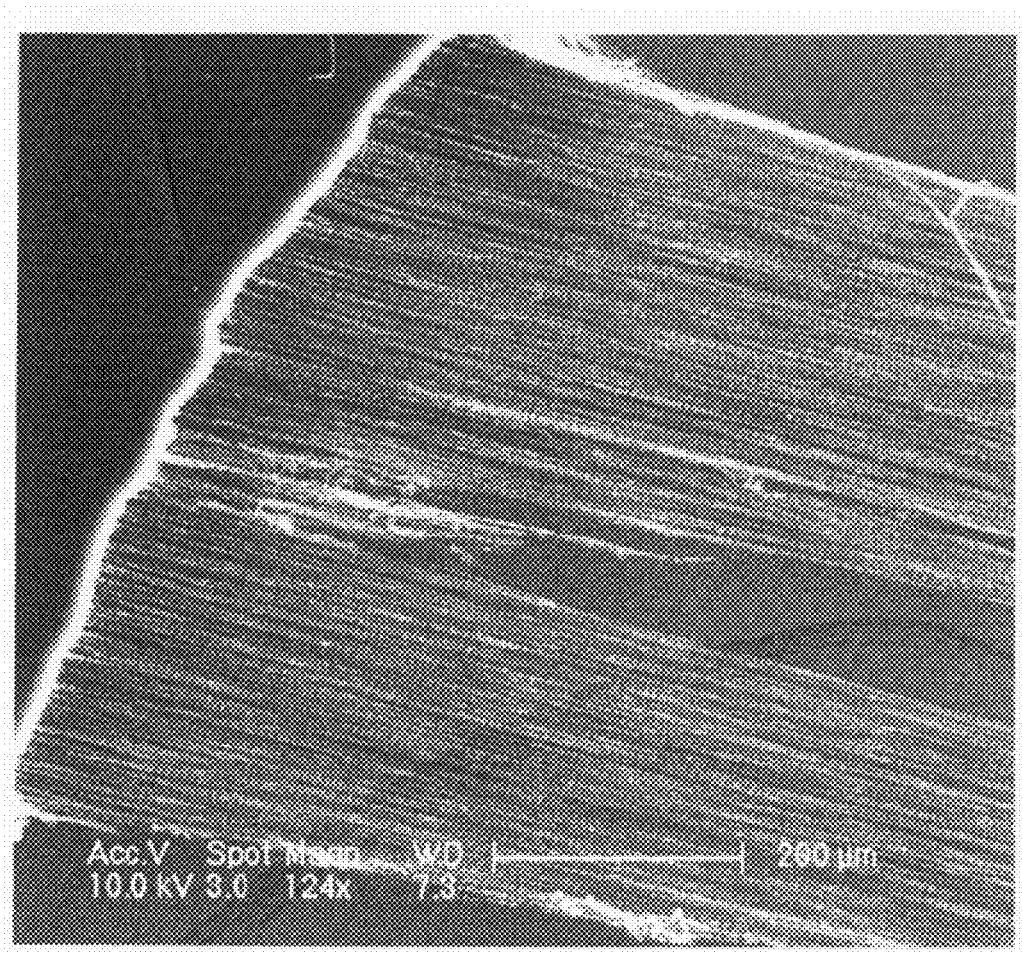
FIG. 2 is a scan electronic microscopy (SEM) photograph of a carbon nanotube yarn string.

In the step (2), the carbon nanotube yarn strings 22 may be drawn out from the carbon nanotube array 20 with a tool with a sharp tip, such as a tweezers. Specifically, an initial carbon nanotube bundle with a number of carbon nanotubes of the carbon nanotube array 20 can be drawn out with tweezers. As a carbon nanotube bundle is drawn out, other carbon nanotube bundles are also drawn out due to the van der Waals attractive force between ends of adjacent bundles and a successive carbon nanotube yarn string 22 is formed. The carbon nanotube yarn string 22 may have a length of several centimeters and a thickness of several microns. Referring to FIG. 2, a SEM photograph of the carbon nanotube yarn string 22 of the present embodiment is shown. In the present embodiment, a number of carbon nanotube yarn string 22 are drawn out from the carbon nanotube array 20.

Figure 3:
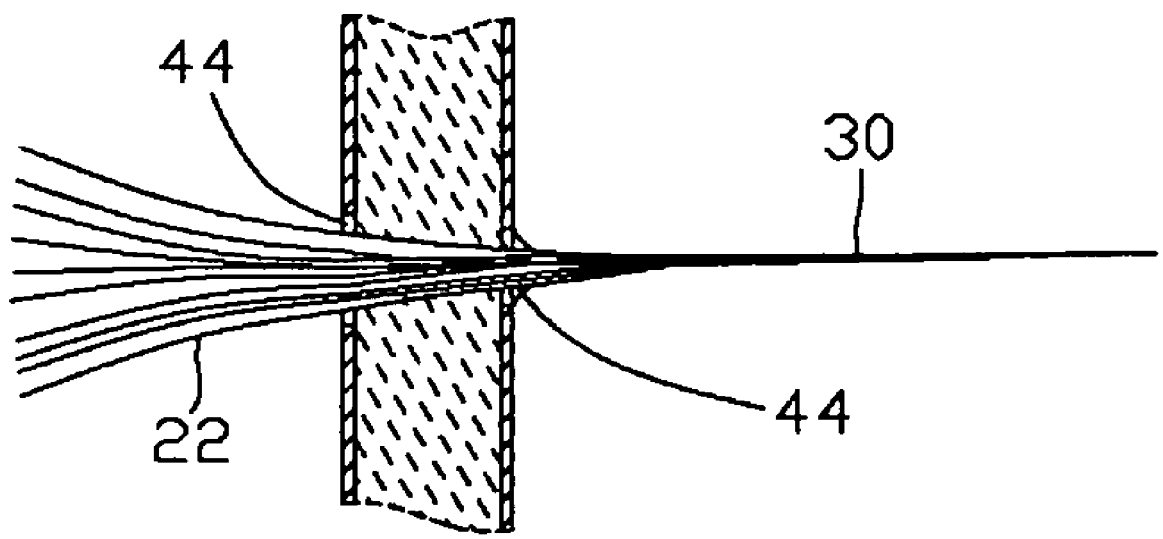
FIG. 3 is an enlarged sectional view of a tube with a through hole of the device of FIG. 1.
Figure 6:
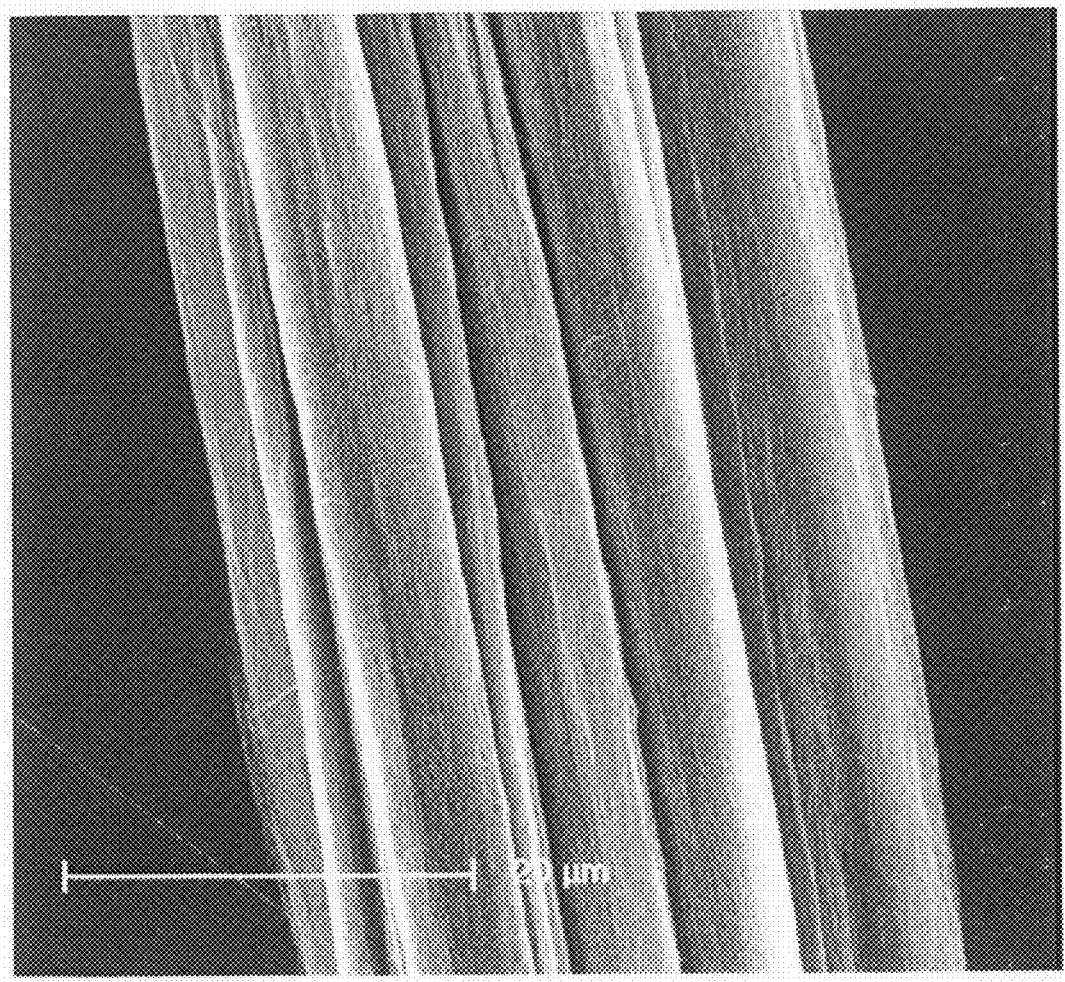
FIG. 6 is a SEM photograph of a carbon nanotube yarn of a preferred embodiment of the present invention.
Figure 7:
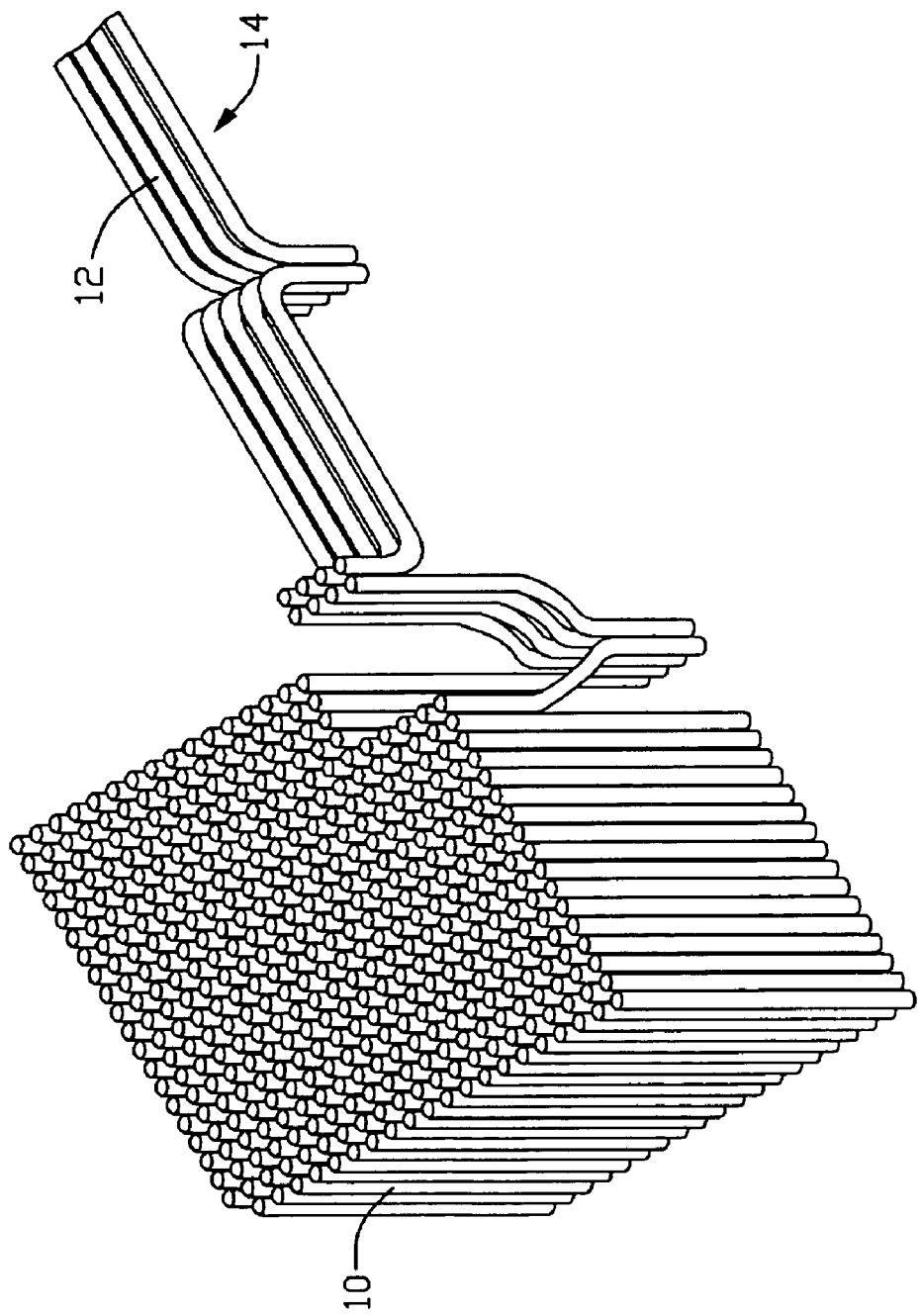
FIG. 7 is schematic view of a conventional carbon nanotube yarn being drawn out from a carbon nanotube array.

In the step (3), referring to FIGS. 1 and 3, a device for continuously soaking the carbon nanotube yarn strings 22 is shown. The device includes a container 40 for containing the organic solvent 50 therein, a tube 42 and a vessel 60 configured for collecting the organic solvent. The tube 42 is coupled to a bottom of the container 40 and is in communication with the container 40. The tube has a through hole 44 defined therein for allowing the carbon nanotube yarn strings 22 to pass therethrough. The container 40 is configured for supplying the organic solvent 50 to the tube 42. A method for soaking the carbon nanotube yarn strings 22 in the organic solvent 50 thereby shrinking the carbon nanotube yarn strings 22 into a single strand of carbon nanotube yarn 30 using above-described device is described below, which includes the steps in no particular order of:

(a) placing the container 40 above the carbon nanotube yarn strings 22, the container 40 containing the organic solvent 50 for treating the carbon nanotube yarn strings 22;

(b) supplying the organic solvent 50 to the tube 42, wherein the organic solvent 50 may be a volatilizable organic solvent such as ethanol, methanol, acetone, dichloroethane or chloroform;

(c) placing the vessel 60 below the through hole 44 of the tube 42 for collecting leaking organic solvent;

(d) passing the carbon nanotube yarn strings 22 through the through hole 44 of the tube 42 continuously to soak the carbon nanotube yarn strings 22 in the organic solvent 50, thereby shrinking the carbon nanotube yarn strings 22 into the carbon nanotube yarn 30 with a diameter of 20~30 microns under the action of surface tension of the organic solvent 50. FIG. 6 shows a SEM photograph of the carbon nanotube yarn 30 of the present embodiment.

Figure 4:
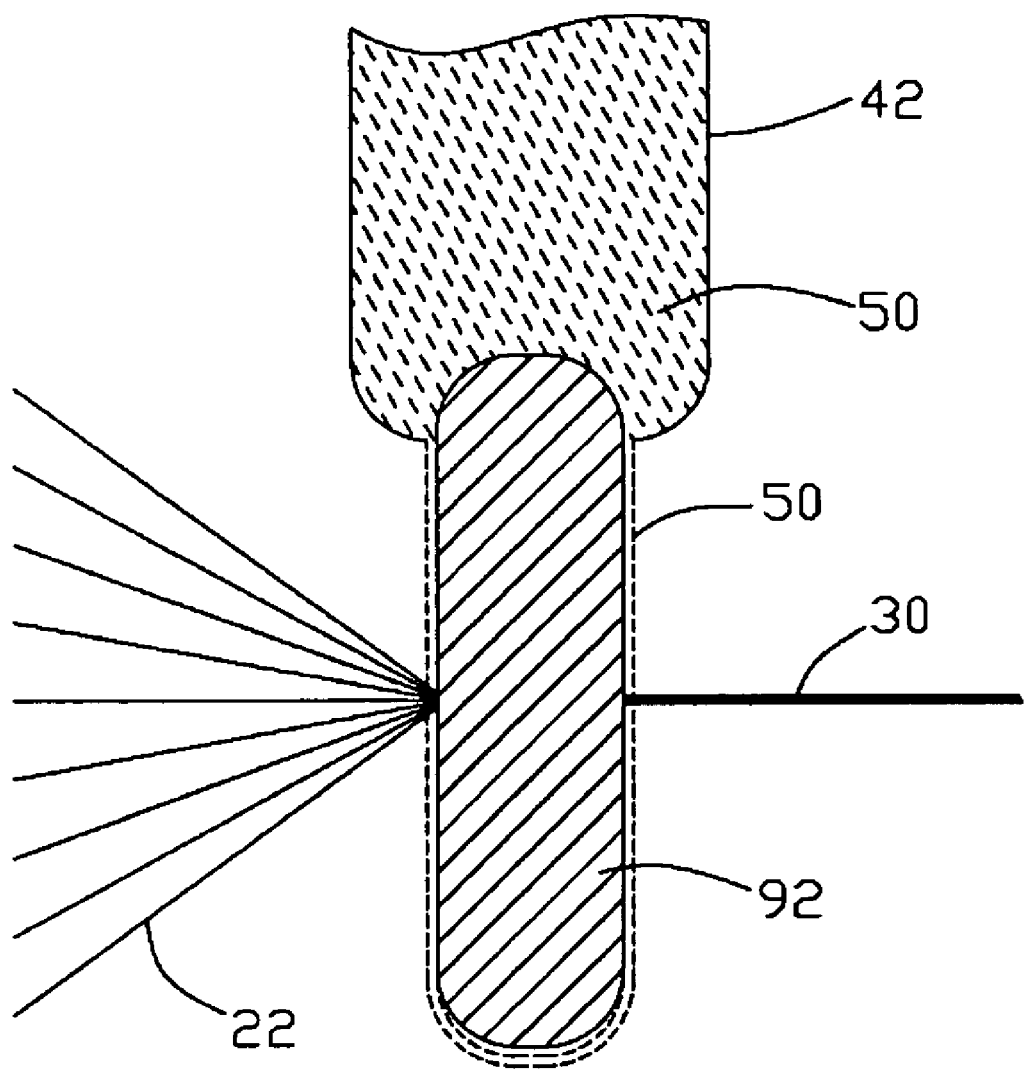
FIG. 4 is an enlarged sectional view of a tube connecting and coupling to a rod.

Alternatively, the tube 42 can have no through hole 44 defined therein, and it can be connected and coupled to a rod. FIG. 4 shows that the tube 42 is connected and coupled to a rod 92. The organic solvent 50 can flow along surface of the rod 92 and the carbon nanotube yarn strings 22 can be attached over or below the rod 92, thereby the carbon nanotube yarn strings 22 shrink into the carbon nanotube yarn 30 due to the surface tension of the organic solvent 50.

Figure 5:
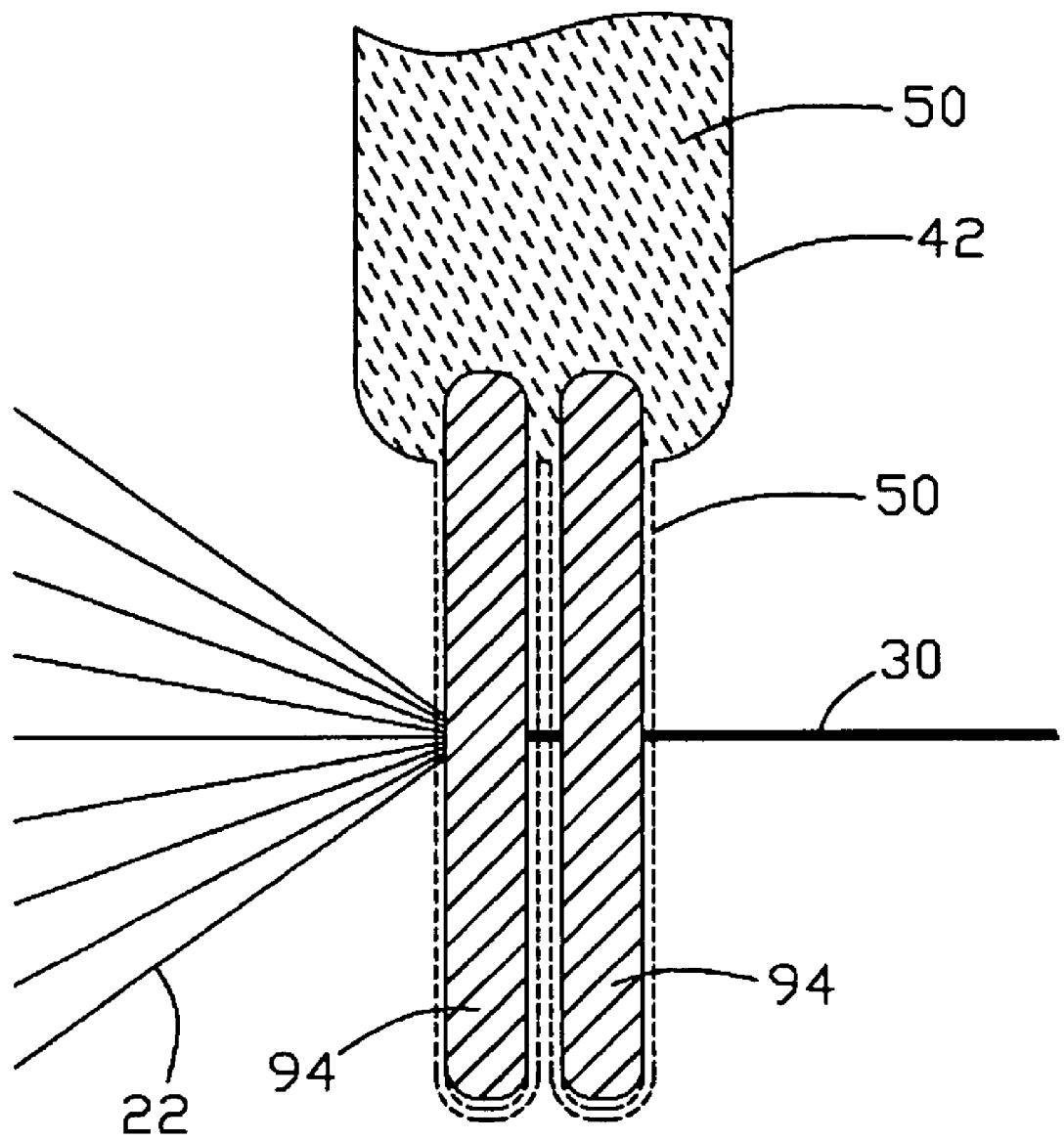
FIG. 5 is an enlarged sectional view of a tube connecting and coupling to two rods.

Of course, the tube 42 can also be connected and coupled to more than one rod, and the more than one rod align together in a parallel form. Referring to FIG. 5, that the tube 42 being connected and coupled to two rods 94 is shown. The organic solvent 50 can flow along surface of the rods 94 and the carbon nanotube yarn strings 22 can be attached over or below the rods 94, thereby the carbon nanotube yarn strings 22 shrink into the carbon nanotube yarn 30 due to the surface tension of the organic solvent 50.

The carbon nanotube yarn 30 includes a number of carbon nanotube yarn strings packed closely together, and each of the carbon nanotube yarn strings includes a number of carbon nanotube bundles which are joined end to end by van der Waals attractive force, and each of the carbon nanotube bundles includes a number of carbon nanotubes substantially parallel to each other. The ratio of surface area to volume of the carbon nanotube yarn 30 is low and the carbon nanotube yarn 30 therefore has non-stick properties.

The carbon nanotube yarn 30 can be coiled onto a bobbin 80 with a electromotor 70 or by hand.

Alternatively, the carbon nanotube yarn strings 22 can be soaked by directly soaking the entire carbon nanotube yarn strings 22 in an organic solvent 50, a shrunk carbon nanotube yarn 30 can be obtained after the soaked carbon nanotube yarn strings 22 are pulled out from the solvent under the action of surface tension of the organic solvent 50. Of course, just one carbon nanotube yarn string drawn out from the carbon nanotube array 20 can be shrunk into a carbon nanotube yarn 30 with above-described steps.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Furthermore, this application is intended to cover such departures from the present disclosure as come within known or customary practice in the art to which the invention pertains and which fall within the limits of the appended claims or equivalents thereof.

What is claimed is:

1. A method for making a carbon nanotube yarn, the method comprising the steps of:
   (1) providing a carbon nanotube array that is able to have one or more carbon nanotube yarn strings drawn therefrom;
   (2) drawing out at least one planar carbon nanotube yarn string from the carbon nanotube array;
   (3) applying organic solvent to the at least one carbon nanotube yarn string;
   (4) removing the organic solvent such that the at least one planar carbon nanotube yarn string shrinks into a single non-planar strand of carbon nanotube yarn due to the surface tension of the organic solvent.

2. The method as claimed in claim 1, wherein the carbon nanotube array is manufactured using a chemical vapor deposition method.

3. The method as claimed in claim 1, wherein the at least one carbon nanotube yarn string is drawn out from the carbon nanotube array using tweezers.

4. The method as claimed in claim 1, wherein the at least one carbon nanotube yarn string comprises a plurality of carbon nanotube bundles substantially parallel to each other which are joined end to end by van der Waals attractive force, and each of the carbon nanotube bundles comprises a plurality of carbon nanotubes substantially parallel to each other.

5. The method as claimed in claim 1, wherein the organic solvent is selected from the group consisting of ethanol, methanol, acetone, dichloroethane, chloroform, and any combination thereof.

6. The method as claimed in claim 1, wherein a width of the carbon nanotube yarn string is in the approximate range from 200 microns to 1 millimeter.

7. The method as claimed in claim 1, wherein a diameter of the carbon nanotube yarn is in the approximate range from 20 to 30 microns.

8. The method as claimed in claim 1, wherein the organic solvent volatilizes at room temperature.

9. The method as claimed in claim 1, wherein the carbon nanotube yarn string is soaked by passing the carbon nanotube yarn string through the organic solvent.

10. A method for making a carbon nanotube yarn, the method comprising the steps of:
   (1) providing a carbon nanotube array that is able to have one or more carbon nanotube yarn strings drawn therefrom;
   (2) drawing out a number of planar carbon nanotube yarn strings from the carbon nanotube array;
   (3) placing a container above the planar carbon nanotube yarn strings, the container containing an organic solvent for treating the planar carbon nanotube yarn strings;
   (4) supplying the organic solvent to a pathway, the pathway being coupled to a bottom of the container and is in communication with the container, the pathway having a through hole defined therein;
   (5) passing the planar carbon nanotube yarn strings through the through hole continuously to soak the planar carbon nanotube yarn strings in the organic solvent; and
   (6) allowing the planar carbon nanotube yarn strings to shrink into a single strand of carbon nanotube yarn due to the surface tension of the organic solvent as the organic solvent is removed.

11. A method for making a carbon nanotube yarn, the method comprising the steps of:
   (1) providing a carbon nanotube array that is able to have one or more carbon nanotube yarn strings drawn therefrom;
   (2) drawing out a number of carbon nanotube yarn strings from the carbon nanotube array;
   (3) having a container, the container containing an organic solvent for treating the carbon nanotube yarn strings;
   (4) supplying the organic solvent to a pathway, the pathway being coupled to the container and is in communication with the container, the pathway being connected and coupled to at least one rod;
   (5) establishing contact between the carbon nanotube yarn strings and the rod continuously to soak the carbon nanotube yarn strings in the organic solvent; and
   (6) allowing the carbon nanotube yarn strings to shrink into a single strand of carbon nanotube yarn due to the surface tension of the organic solvent as the organic solvent is removed.

12. The method as claimed in claim 1, wherein there are at least two or more planar carbon nanotube yarn strings drawn from the carbon nanotube array.

* * * * *